United States Patent Office 3,255,169
Patented June 7, 1966

3,255,169
ALUMINUM HYDROAMINATE ACTIVATORS IN OLEFIN POLYMERIZATION
Kenneth K. Kearby, Watchung, N.J., assignor to Esso Research and Engineering Company, a corporation of Delaware
No Drawing. Filed May 3, 1961, Ser. No. 107,329
3 Claims. (Cl. 260—93.7)

This invention relates to improved catalyst components for the low pressure polymerization of alpha olefins. More particularly, it relates to the polymerization of $C_3$ and higher olefins with catalyst components containing aluminum hydroaminates.

The low pressure polymerization of olefins with catalyst systems made up of a partially reduced, heavy, transition metal compound and a reducing metal-containing compound to high density, often isotactic, high molecular weight, solid, relatively linear products has been assuming ever increasing importance and is now well known.

For the purpose of convenience, details of the low pressure catalytic process are presented below, although it should be realized that these by themselves constitute no part of this invention.

The alpha olefinic feeds normally utilized in polymerization and copolymerization include $C_2$–$C_6$ olefins, e.g., ethylene, propylene, butene-1, hexene-1, etc., with ethylene and propylene preferred. The process is described in the literature, e.g., see U.K. Patent 810,023 and "Scientific American," September 1957, pages 98 et seq.

In the process the polymers are prepared by polymerizing the monomer with the aid of certain polymerization catalysts. The catalysts are solid, insoluble, reaction products obtained by partially reducing a heavy metal halogenide of a Group IV–B, V–B, and VI–B metal of the Periodic System particularly those of vanadium or titanium, such as vanadium tetrachloride, or a titanium halide, e.g., $TiCl_4$, $TiBr_4$, etc., preferably with metallic aluminum. The preferred catalyst of this type is usually prepared by reducing 1 mole of titanium tetrahalide, usually tetrachloride, with about one-third mole of aluminum to give a material corresponding to $$TiCl_3 \cdot 0.33AlCl_3$$

thus containing cocrystallized $AlCl_3$. (For further details see copending U.S. application Serial No. 578,198, filed April 6, 1956, now Patent No. 3,128,252, and Serial No. 766,376, filed October 19, 1958 now Patent No. 3,032,513). The product is then activated with an aluminum alkyl compound corresponding to the formula RR'AlX. In this formula, R, R' and X preferably are alkyl groups of 2 to 8 carbon atoms, although X may alternativey be hydrogen or a halogen, notably chlorine. Typical examples of the aluminum alkyl compounds are aluminum triethyl, diethyl aluminum chloride, aluminum triisobutyl, etc.

The monomer is then contacted with the resulting catalyst in the presence of a hydrocarbon solvent such as isopentane, n-heptane, benzene, xylene, etc. The polymerization is conveniently effected at temperatures of about 0° to 100° C. and pressures ranging from about 0 to 500 p.s.i.g., usually 0 to 100 p.s.i.g. The catalyst concentration in the polymerization zone is preferably in the range of about 0.1 to 0.5 weight percent based on total liquid and the polymer product concentration in the polymerization zone is preferably kept between about 2 to 15% based on total contents so as to allow easy handling of the polymerized mixture. The proper polymer concentration can be obtained by having enough of the inert diluent present, or by stopping the polymerization before the full polymerization capacity of the catalyst has been utilized, or before 100% conversion of the monomer has been realized.

When the desired degree of polymerization has been reached, a $C_1$ to $C_3$ alkanol such as methanol or isopropyl alcohol is normally added to the reaction mixture for the purpose of dissolving and deactivating the catalyst, removing some catalyst residues from the polymer and for precipitating the crystalline polymer product from solution.

The polymers produced have number average molecular weights in the range of about 100,000 to 300,000 or even as high as 3,000,000 as determined by the intrinsic viscositiy method using the I. Harris correlation (J. Polymer Science, 8, 361 (1952)). The polymers can have a high degree of crystallinity and a low solubility in n-heptane.

It is to be understood that the term "low pressure" polymer as used herein connotes material prepared in the indicated manner and includes homo- and copolymers.

The polymerization of $C_3$ and higher olefins in general poses more problems than simple ethylene polymerization. Additionally, the use of aromatic diluents in the polymerization process sometimes leads to difficulties because of catalyst degradation. It is consequently desirable to make available catalyst components which lead to greater catalyst activity, greater product flexibility, and higher solubility in nonaromatic diluents.

It has now been found that aluminum hydroaminates supply the answers to these problems in the polymerization of $C_3$ and higher olefins in preferably nonaromatic diluents when they are admixed with the transition metal halogenides previously disclosed. This is surprising in that the activities of these systems are greater for propylene polymerization than ethylene and also superior to the use of lithium aluminum hydrides containing equivalent or greater amounts of hydrogen.

The $C_3$ and higher olefins utilized in polymerization and copolymerization according to this invention include alpha mono-olefins, preferably those in the $C_3$ to $C_6$ range e.g. propylene, butene-1, hexene-1, etc. as well as styrene and diolefins such as butadiene, isoprene, etc.

The aluminum hydroaminate can be prepared in general by the reaction of amines and imines with aluminum hydride or lithium aluminum hydride. Primary and secondary amines can thus be employed. In general, the formula for the aluminum hydroaminate can be characterized by $H_xAl(NH_yR_{2-y})_{3-x}$ where the value of $x$ is 1–2, $y$ is 0 or 1 and R is a lower alkyl group, i.e. having 1 to 6 carbon atoms. Mixtures of compounds where $x$ is 1 and 2 make fractional values possible and these are illustrated in the examples and covered herein by the formulae which follow. Particularly effective aluminum hydroaminates are: $HAl(NEt_2)_2$, $HAl(NHC_4H_9)_2$, $$HAl(NHC_2H_5)_2$$

and $HAl(N(CH_3)_2)_2$. Another effective material is

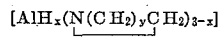

The catalyst components in the process are handled in the same manner as the conventional operation. The aluminum hydroaminate is normally dissolved in the hydrocarbon diluent and then the titanium halogenide is added. Molecular ratio of the aluminum hydroaminates to the transition metal halogenide is in the range of 0.1 to 10, usually 0.5 to 2.

The diluents that can be employed for catalyst dispersion and in the polymerization are conventional aliphatic and naphthenic hydrocarbons, e.g., isopentane, isooctane, normal heptane, cyclohexane, or any other pure, dry $C_3$–$C_{12}$ paraffin or isoparaffin or any $C_5$–$C_{12}$ naphthene.

This invention and its advantages will be better understood by reference to the following examples.

EXAMPLE 1.—USE OF $H_{1.6}Al(NEt_2)_{1.4}$

This material was prepared under a dry nitrogen atmosphere by the reaction of 13 grams $AlCl_3$ with 15 grams of $LiAlH_4$ in isooctane for 1½ hours at 80° C. before 50.5 cc. of redistilled diethylamine was added at 50° C. The filtrate analyzed 0.88% N, 2.3% $Al_2O_3$ (1.15% Al) and 0% Li.

5.0 cc. of this solution in 75 cc. of dry isooctane was placed in a dry 300 cc. autoclave with 1 g. of $TiCl_{2.8}$—0.4 $AlCl_3$ and pressurized with 250 p.s.i.g. of nitrogen and 150 p.s.i.g. of propylene. The bomb was rocked for two hours at 115° C. After cooling a yield of 42.5 grams of solid polypropylene was obtained.

A comparison test with $LiAlH_4$ in place of the aluminum hydroaminate, and containing the same amount of hydrogen as the $H_{1.6}Al(NEt_2)_{1.4}$ compound gave only 4.4 g. solid polypropylene.

This demonstrates both the high activity of the catalyst components of this invention as well as the improvement over the use of lithium aluminum hydrides alone which contain at least as much hydrogen. As compared with lithium aluminum hydride or other metal hydrides, the aluminum hydroaminates have advantages of being soluble in saturated hydrocarbon diluents, and in being either less pyrophoric or not pyrophoric at all.

EXAMPLE 2.—USE OF $H_{1.6}Al(NHBu)_{1.4}$ 27 g. $LiAlH_4$ and 31.7 g. of $AlCl_3$ were reacted in 1 l. isooctane for 1.5 hours at 80° C. and cooled to 60° C. Dry n-butyl amine was then added drop-wise with stirring until 129 cc. were added. The mixture was held at 60° C. overnight and gave off a total of 1.69 cu. ft. of $H_2$. The cooled product was filtered and the filtrate evaluated as above with the Ti compound of the previous example. The yield of solid polypropylene was 28.5 grams. This demonstrates that primary amines also make active aluminum hydroaminate catalyst components.

EXAMPLE 3.—USE OF $H_{1.7}Al(NHEt)_{1.3}$

This was prepared the same as for Example 2 except that 83.7 cc. of $EtNH_2$ were used instead of the 129 cc. of n-butyl amine.

The test with $TiCl_{2.8}$—0.4 $AlCl_3$ catalyst gave 24 grams of solid polypropylene. This shows that other primary amines may be used to prepare active aluminum hydroaminate catalyst components.

EXAMPLE 4.—USE OF 3 MOLS AMINE PER MOL $AlH_3$

This preparation was similar to Example 2 except that 305 cc. of diethyl amine was used instead of the 129 cc. of n-butyl amine (3 mols amine/mol $AlH_3$).

The test with $TiCl_{2.8}$—0.4 $AlCl_3$ catalyst gave 14.5 g. of solid polypropylene. This shows that the optimum ratio of N to Al in the aluminum hydroaminate is less than 3, i.e. 1 or 2.

EXAMPLE 5.—USE OF POLYMETHYLENEIMINE TYPE MATERIALS 89 cc. of hexamethyleneimine

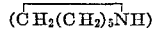

was reacted under $N_2$ with 30 g. $LiAlH_4$ in 1 l. isooctane and filtered. After removing 20 cc. of filtrate, vacuum distillation of the remainder gave 84.5 g. of viscous bottoms. Either 1 g. of these bottoms or 10 cc. of the filtrate with 1 g. of $TiCl_{2.8}$—0.4 $AlCl_3$ catalyst gave 39.5 g. of solid polypropylene. This demonstrates that active catalysts can be made using imines instead of amines.

EXAMPLE 6.—IMPORTANCE OF THE AMOUNT OF AMINE $LiAlH_4$ was successively reacted with three 1 mol portions, and then a 2 mol portion of diethyl amine. The isooctane soluble products were filtered and vacuum concentrated, and the products analyzed and evaluated as catalysts. The results show that the first product formed contained no lithium, 1.65 mols of amine and 1.35 mols H. This product formed an active catalyst. The subsequent reaction of the residue with the three additional portions of amine gave two soluble mixed Li-Al-amine products and a soluble lithium aminate respectively. The residue was lithium hydride. With the $TiCl_3$–0.4 $AlCl_3$ catalyst, the intermediate LiAl and Li aminates were not active. These results are summarized below:

[Propylene polymerization, 400 p.s.i., 90–115° C., 300 cc. autoclave, 2 hours, 75 cc. isooctane diluent]

| Amine Treat No. | 1 | 2 | 3 | 4 | Residue (13.3%) |
|---|---|---|---|---|---|
| Mols $Et_2NH$* | 1 | 1 | 1 | 2 | |
| Vac. Concentrates of $iC_8$ Soluble Product: Mol Ratios— | | | | | |
| Al | 1.00 | 1.00 | 1.00 | 0.001 | 0.013 |
| Li | .01 | 0.69 | 1.02 | 1.00 | 1.00 |
| $NEt_2$ | 1.65 | 3.7 | 4.74 | 1.07 | 0.071 |
| H | 1.35 | 0.53 | 0.3 | 0.16 | 0.84 |
| Catalyst Activity, 1 g.+1 g. CRD**: | | | | | |
| G. polypropylene | 43 | 2.0 | 0 | 0 | |
| Density | .885 | | | | |
| M.P., ° C | 157 | | | | |
| M.W. | 590,000 | | | | |

*Per mol $LiAlH_4$.
**CRD catalyst: $TiCl_{2.8}$–0.4 $AlCl_3$.

The reaction of 1 mol of $LiAlH_4$ with 1 mol $Et_2NH$ in $iC_8$ gave $AlH_{1.35}(NEt_2)_{1.65}$ instead of the expected $AlH_2NEt_2$. In this experiment, the $LiAlH_4$ was suspended in isooctane and was not soluble. When the $LiAlH_4$ was dissolved in diethyl ether and then slowly reacted by dropwise addition of an ether solution of diethyl amine, a soluble product was obtained which was recrystallized from ether. It analyzed $AlH_{2.46}N_{0.96}Li_{0.11}$ indicating the main product to be $AlH_2NEt_2$. One gram of this with one gram of $TiCl_{2.8}$–0.4 $AlCl_3$ gave 39.5 g. of polypropylene of 0.896 density, 165° C. M.P., 3560 p.s.i. tensile strength and 367,000 molecular weight. Yields of about 40 g./g. in these tests probably reflect complete conversion of the propylene and not maximum g./g. yields for the catalyst. It is believed the use of the soluble $LiAlH_4$ permitted a better mol per mol reaction, but the obtaining $AlH_2NEt_2$ may also be due to crystallization differences from ether and isooctance solutions. The dihydroaluminum aminate is less soluble in isooctane than the monohydroaluminum aminate.

A catalyst was tested using 1 g. $TiCl_{2.8}$–0.4 $AlCl_3$ with 1 g. $LiAlH_4$. This contains 11 times more active H than the $AlH_{1.35}(NEt_2)_{1.65}$ used in Example 6. This large amount of $LiAlH_4$ gave 35.6 g. of polymer which had a molecular weight of only 35,600 about one tenth that obtained with the amine compound.

On the other hand, 1 g. of $TiCl_{2.8}$–0.4 $AlCl_3$ catalyst gave 34.5 g. of polymer with 0.5 g. of $AlH_{1.4}(NEt_2)_{1.6}$ and 39 g. when using 1 g. with 0.05 g. of the amine compound. This contained only $\frac{1}{30}$ as much active H as the $LiAlH_4$ in the above example. This shows a much higher activity for small amounts of the amine compound as compared with an ordinary metal hydride $LiAlH_4$. When using 0.024 g. $LiAlH_4$ only 4.4 g. of polymer were obtained.

EXAMPLE 7

An aluminum hydroaminate made as in Example 1, except for the use of dimethyl amine instead of diethyl amine, with $TiCl_{2.8}$–0.4 $AlCl_3$ gave 33 g. of polypropylene as compared with 42.5 g. for the diethyl amine.

The advantages of this invention will be apparent to those skilled in the art. Novel catalyst component of increased flexibility are made available.

It is to be understood that this invention is not limited to the specific examples which have been offered merely as illustrations and that modifications may be made without departing from the spirit of the invention.

What is claimed is:

1. In a process for polymerizing propylene in the presence of a catalyst formed by mixing an aluminum containing compound with an aluminum reduced titanium-tetrachloride containing cocrystallized $AlCl_3$, the improvement which comprises utilizing as the aluminum compound $HAl(NHC_4H_9)_2$.

2. In a process for polymerizing propylene in the presence of a catalyst system formed by admixing an alumium containing compound with an aluminum reduced titanium-tetrachloride containing cocrystallized $AlCl_3$, the improvement which comprises utilizing as the aluminum compound $HAl(NHC_2H_5)_2$.

3. In a process for polymerizing propylene in the presence of a catalyst formed by admixing an aluminum containing compound with an aluminum reduced titanium-tetrachloride containing cocrystallized $AlCl_3$, the improvement which comprises utilizing as the aluminum compound $HAl(N(CH_3)_2)_2$.

References Cited by the Examiner

UNITED STATES PATENTS

| | | | |
|---|---|---|---|
| 2,893,984 | 7/1959 | Seelbach et al. | 260—93.7 |
| 2,929,808 | 3/1960 | Ross et al. | 260—94.9 |
| 2,996,459 | 8/1961 | Anderson et al. | 260—94.9 |

FOREIGN PATENTS 534,792   1/1955   Belgium.

JOSEPH L. SCHOFER, *Primary Examiner.*

LESLIE H. GASTON, WILLIAM H. SHORT,
*Examiners.*